United States Patent Office

3,300,293
Patented Jan. 24, 1967

---

3,300,293
SLOW RELEASE FERTILIZER COMPRISING A DISPERSION OF UREA-WAX ADDUCT IN WAX, AND METHOD OF MAKING
Andrew J. Bozzelli, Springfield, Pa., Steven G. Belak, Claymont, Del., and Robert H. Campbell, Brookhaven, Pa., assignors to Sun Oil Company, Philadelphia, Pa., a corporation of New Jersey
No Drawing. Filed Sept. 11, 1963, Ser. No. 308,087
11 Claims. (Cl. 71—28)

This application is a continuation-in-part of an application filed December 13, 1962, Serial No. 244,278, by A. J. Bozzelli, S. G. Belak, and R. H. Campbell, now abandoned.

This invention relates, inter alia, to slow release fertilizer compositions and to methods of preparing same. The compositions of the invention contain an adduct of urea and paraffin wax as the active fertilizer ingredient. In its method aspects the invention pertains more particularly to the preparation of these adduct compositions and also to a means of improving the characteristics of a urea-wax fertilizer.

Nitrogen, potassium, and phosphorus are essential elements for plant growth and commercially available fertilizers invariably contain one or more of these elements. Examples of those in frequent use at the present time include urea, ammonium nitrate, potassium chloride, sodium nitrate, monoammonium phosphate, diammonium phosphate, potassium sulfate, calcium cyanamide, potassium phosphate, potassium nitrate, superphosphate (a mixture of calcium acid phosphate and calcium sulfate), and triple superphosphate (calcium acid phosphate). Urea is a preferred source of nitrogen because it contains a higher percentage of nitrogen than the other nitrogen fertilizer compounds mentioned.

The number of fertilizer compounds applied to the soil at a given time depends mainly upon the soil analysis and the crops to be grown. In some cases only nitrogen is needed hence only a nitrogen fertilizer is applied. In the majority of cases, however, all three of the essential elements are needed and in such cases the fertilizer actually applied to the soil is a blend of a nitrogen fertilizer, a potassium fertilizer, and a phosphorus fertilizer. Some compounds such as diammonium phosphate contain more than one essential element. A fertilizer containing all three essential elements is conventionally referred to as a complete fertilizer. It is also conventional to state the amount of each essential element in the complete fertilizer by a series of numbers which refer, in order, to the weight percentage of nitrogen (as N), phosphorus (as $P_2O_5$), and potassium (as $K_2O$) in the fertilizer. For example a 20-10-5 fertilizer contains 20% nitrogen, 10% phosphorus, and 5% potassium by weight. Fertilizers lacking an essential element are also described by this system but by conventional terminology they are not complete fertilizers. Thus a 10-0-10 fertilizer contains 10% nitrogen, no phosphorus, and 10% potassium. In addition to the above, most conventional fertilizers, whether complete or otherwise, contain some inert material in order to maintain the percentage of the essential elements present in the fertilizer at a relatively low level in an attempt to avoid excessive local concentrations of, say, nitrogen in the soil which may result in "burned" crops.

Unfortunately most of the commercial fertilizers mentioned previously are readily water soluble and this creates a number of disadvantages. In a heavy rainfall much of the fertilizer may be dissolved in the rainwater and soaked into the ground below the plant roots or rapidly transported away by flowing surface water. This fertilizer never becomes available to the plants. Another disadvantage is that the fertilizer often becomes available to the plant too rapidly resulting in injury to the plant rather than benefit. This is often noticed in "burned" lawns or crops.

One method of reducing the rate at which the fertilizer e.g., urea, is consumed is to disperse the fertilizer in molten wax, form the slurry into small particles in a mold, and allow the particles to cool. The resulting particles are a dispersion of solid urea particles in solid wax. One disadvantage of this approach is that in areas of heavy rainfall the wax content of the fertilizer must often be relatively high in order to provide a satisfactory reduction in the rate at which the fertilizer is released to the plants. This relatively high quantity of wax may make the fertilizer too expensive for commercial acceptance. Fertilizer compositions containing a relatively low amount of wax and yet having a high resistance to leaching by water are desirable. Conversely a means of improving the water resistance of a urea-wax fertilizer is desirable.

We have now discovered that the adduct formed by reacting urea and paraffin wax is a slow release fertilizer. We have also discovered that the water resistance of such an adduct can be increased, if necessary, by dispersing the adduct in wax. Surprisingly, these compositions are more water resistant than compositions containing the same total amount of urea and wax but in which urea alone rather than the urea-wax adduct is dispersed in wax. We have further discovered that the water resistance of a dispersion of the adduct in wax can be increased by incorporating asphalt into the wax.

We have also made the surprising discovery that a dispersion of solid urea in solid paraffin wax has the totally unexpected but highly beneficial property of improving in water resistance with time. When particles of such a dispersion are first prepared their water resistance is relatively low. Several weeks later, however, the water resistance of the particles is substantially higher. This unpredictable increase is believed due to reaction of the solid urea and solid paraffin wax to form an adduct.

It is known that urea reacts with paraffin wax to form a complex. The complex has been referred to in the art as a clathrate, adduct, canal complex, complex, etc., but since the term adduct is by far the most common, it is used herein. The structure of the adduct is also known and is best visualized by considering the urea crystals in the adduct as in the shape of a relatively long spiral. The normal or substantially normal paraffins of the paraffin wax are inside the urea spirals, the longitudinal axis of any given paraffin extending in the same direction as the longitudinal axis of the urea spiral within which it is contained. The composition of the adduct varies with the length of the paraffin chain, i.e., with the molecular weight of the paraffin, but for paraffin waxes is usually about 76% urea and 24% paraffin wax. All percentages in this specification are by weight.

The term paraffin wax as used herein is to be distinguished from certain other types of waxes. By conventional definition and as used herein, paraffin wax refers to a certain type of wax obtained from petroleum. Consequently the term does not include other natural waxes such as beeswax, carnauba wax. Even though some non-petroleum derived waxes will form adducts with urea, the adducts are not suitable for the present purpose. Petroleum yields two types of waxes, paraffin and microcrystalline. The differences and similarities of these two kinds of waxes are well known to those skilled in the art and are summarized in Bennet, Commercial Waxes, Chemical Publishing Co. (1956), pages 84–88. Both paraffin and microcrystalline waxes contain mainly saturated paraffin hydrocarbons, the former containing mainly straight chain paraffins while the latter contains a substantial amount of branch chain paraffins. Some typical properties of paraffin and microcrystalline waxes are shown in Table I below.

*Table I*

| Property | Paraffin Wax | Microcrystalline Wax |
|---|---|---|
| Molecular Weight | 250–500 | 500–800. |
| Melting Point [1] | 110–165° F | 140–210° F. |
| Viscosity at 210° F.[2] | 30–50 S.U.S | 60–100 S.U.S. |
| Penetration at 77° F.[3] | 5–25 d.m.m | 5–25 d.m.m. |

[1] ASTM D–127.
[2] ASTM D–446.
[3] ASTM D–1321, 100 g., 5 sec.

As can be seen from the data in Table I some of the physical properties of the paraffin waxes overlap the normal range of the same property in the microcrystalline waxes. The property which can be used, as is well known, to distinguish paraffin wax from microcrystalline wax is the type of crystals present in each. Paraffin wax has large well-formed crystals while microcrystalline wax contains small irregular crystals and no well-formed crystals of any size. Indeed, microcrystalline wax is sometimes referred to as amorphous.

As already described, an adduct of urea and paraffin wax has been found to be a slow release fertilizer. The slow release properties of such an adduct can be determined as follows: An adduct is formed in a manner described hereinafter from urea and a paraffin wax having a melting point of 126° F., a penetration at 77° F. of 18 d.m.m., and a viscosity of 38 S.U.S. at 210° F., these properties being determined by the tests indicated in Table I. The adduct has a urea content of 76% and a wax content of 24%. A known amount of the adduct is submerged in water without agitation and at periodic intervals thereafter the water is withdrawn and replaced with fresh water. The withdrawn water is analyzed for urea content. Knowing the amount of urea in the original sample and the amount of urea in the withdrawn water, the amount of urea remaining in the fertilizer (i.e., the adduct) as periodic times after initial submergence can be calculated. The data in Table II show these results for the above described adduct.

*Table II*

| Hours of submergence: | Percent urea remaining |
|---|---|
| 0 | 100 |
| 3 | 78 |
| 10 | 55 |
| 20 | 30 |

When urea alone is submerged in water it dissolves in a few minutes. Hence the data contained in Table I show that a urea-paraffin wax adduct has a substantial resistance to leaching by water. Furthermore, it should also be noticed that the adduct is not completely resistant to leaching by water. In other words, some urea is leached. A completely unleachable fertilizer is, of course, of no value as a fertilizer. Surprisingly, however, the adduct is even more water resistant than a dispersion of urea alone, rather than the adduct, in paraffin wax. This is shown by the data contained in Table III which shows the percent urea remaining after 3, 10, and 20 hours submergence of a dispersion of urea in a paraffin wax having the same properties as those previously described with reference to the paraffin wax component of the adduct. The composition of the dispersion is 76% urea-24% wax, the same as the adduct which is the subject of Table II. The dispersion is formed by dispersing the urea in molten paraffin wax of the same type used to prepare the adduct, shaping the resulting slurry into small particles by means of a mold, and allowing the particles to cool and solidify. The particles were larger than the adduct particles previously tested, but this actually inflates the water resistance test results (percent urea remaining) since the urea in small particles is leached out faster than in large particles because the surface area of the smaller particles is greater. The water resistance of the dispersion particles is determined immediately after they are formed, the significance of this fact being explained hereinafter. The data of Table II are also included in Table III for ready comparison.

*Table III*

| Composition (Both Contain 76% Urea, 24% Paraffin Wax) | | Percent Urea Remaining After Stated Hours Under Water | | | |
|---|---|---|---|---|---|
| | | 0 | 3 | 10 | 20 |
| 1 | Adduct | 100 | 78 | 55 | 30 |
| 2 | Dispersion of Urea in Wax | 100 | 20 | 10 | 0 |

It is apparent from these data that the water resistance of the adduct is markedly superior to that of the urea in wax dispersion. This result is surprising when the previously described structure of the adduct is considered. Each crystal of adduct contains a shell of urea within which is one or more paraffin crystals. In other words the urea is on the outside of the adduct crystal and the paraffin is on the inside. In the case of the dispersion the situation is precisely the opposite. Each particle of urea is surrounded by and encased in wax. In other words, the urea is on the inside, the wax is on the outside. It would seem that in using wax to improve the water resistance of urea, the urea should be covered with wax rather than the wax covered with urea. The above data clearly show, however, that such is not the case.

The adduct can be formed in any of several methods. One method involves mixing a methanol solution of urea with a benzene solution of paraffin wax. Upon such mixing the urea and paraffin wax react to form the adduct which immediately precipitates and can then be separated by any convenient method such as filtration. Another method, advantageous in that it does not necessitate the use of solvents, involves merely mixing urea with molten paraffin wax, in proportions corresponding to the adduct composition, i.e., approximately 76% urea–24% paraffin wax, until the adduct forms. Formation of the adduct is indicated by the conversion of the fluid dispersion of the urea in the paraffin wax into a granular, almost dry solid. The time required for the reaction to occur varies but depends to a large extent upon the particle size of the urea, the time decreasing as the urea particle size decreases. With urea particles having a particle size between 60 and 80 mesh the reaction usually occurs in less than 15 minutes. The reaction rate can be increased by the addition of a very small amount of water to the mixture. All mesh sizes in this specification are with reference to U.S. Standard Sieves. When the urea particle size is smaller than 100 mesh, the reaction usually occurs in less than 5 minutes. It should be noted that when urea is mixed with molten paraffin wax in a urea:wax ratio of 1:1 or higher (e.g., 76:24), two types of products are obtainable from the mixture. One product is the adduct and this is obtained by merely mixing urea and wax until a solid product is obtained. Alternatively, the mixture of urea and molten wax can be cooled below the solidification temperature of the mixture prior to the formation of the adduct. In this case the product is a dispersion of solid urea in solid wax. The dispersion which is the subject of Table III was prepared in this manner.

The temperature of the paraffin wax at the time it is mixed with the urea should be above the melting point of the wax and is preferably about 200°–225° F. Higher temperatures are preferably avoided in order to insure against any thermal decomposition of the adduct product.

Although the reaction can be carried out in conventional agitated vessels this is often an unsuitable procedure since it is often difficult to remove the solid adduct from such a vessel. In addition, urea which has a particle size of 98% through 200 mesh tends to agglomerate into hard lumps which makes it difficult to uniformly disperse the urea in the paraffin wax. These difficulties are obviated by subdividing and mixing the urea simultaneously in a roller mill. For example, urea of relatively large particle size, such as commercial crystal urea which is mainly larger than 100 mesh, is dispersed in the paraffin wax. Since the reaction proceeds relatively slowly with this urea particle size a uniform dispersion is obtained before any significant amount of adduct forms. The dispersion is then passed through a roller mill having an opening between the rollers small enough to subdivide the urea to, preferably, 98% through 200 mesh, more preferably, 98% through 400 mesh. When urea is subdivided to such a small size the reaction with the paraffin wax occurs very rapidly. Normally the reaction is complete in one pass through the mill and the discharge from the mill is a solid. If the reaction is not complete the discharge has a wet mushy texture and should be passed through the mill again until the discharge is a solid. The adduct which is the subject of Table II was prepared in essentially this manner. The roller mill contained three rollers turning in such manner that the dispersion passed downwardly between the first and second rollers and then upwardly between the second and third rollers, the clearance between the rollers being such that in one pass through the mill urea is subdivided to 100% through 400 mesh. One pass through the mill was sufficient to cause essentially all of the urea to react to form the adduct.

The slow release properties of a urea-paraffin wax adduct fertilizer have already been shown. In areas of heavy rainfall, however, the water resistance of a urea-paraffin wax adduct may still not be high enough to prevent release of nitrogen faster than it can be consumed by the plants being fertilized. We have now also found that the water resistance of a urea-paraffin wax adduct can be increased by dispersing the particles of adduct in a further quantity of wax and forming the dispersion into particles. The resulting fertilizer particles comprise a dispersion of solid adduct particles in solid wax, the wax being the continuous phase of the dispersion, the adduct particles being the discontinuous phase. Each particle of adduct is substantially completely surrounded by and encased in wax. If desired other fertilizer ingredients such as any of those already mentioned can also be included in the dispersion along with the adduct. In this aspect the invention relates to novel fertilizer compositions and to methods of preparing same. As will be more fully described subsequently the invention also embraces the incorporation of asphalt into the continuous waxe phase of the dispersion.

The dispersion of the adduct in wax can be formed in any convenient manner, but the method employed will determine the type of wax which can be used as the continuous phase of the dispersion. One suitable method involves mixing preformed adduct particles and molten wax, forming the resulting slurry into particles by means of, say, a mold, and allowing the particles to cool and thus solidify. The resulting particles are a dispersion of urea-paraffin wax adduct in wax. The adduct particles can be preformed by the methods previously described. When the dispersion of adduct in wax is formed in this manner, suitable waxes which can be used as the continuous phase of the dispersion are paraffin wax and microcrystalline wax. The former is preferred. Both of these waxes are derived only from petroleum and have been adequately discussed hereinbefore. The term wax as used hereinafter in this disclosure and claims is limited to paraffin wax and microcrystalline waxes. When paraffin wax alone is intended it will be so indicated, i.e., as paraffin wax. The relative amounts of adduct and wax in the dispersion are discussed hereinafter.

A preferred and novel method of preparing the novel adduct dispersions of the invention involves reacting solid urea with an excess of molten paraffin wax, i.e., with an amount of paraffin wax greater than that required for adduct formation. Such reaction can be carried out as previously described in connection with the preparation of the adduct. The paraffin wax is heated to above its melting point, preferably 200°–225° F., the solid urea is added and the resulting slurry is mixed until the adduct forms. Formation of the adduct can be detected by any of several means depending upon the relative amounts of urea and molten paraffin wax. Since an excess of molten wax is used the amount of same will be at least 24% based on the total weight of the urea and paraffin wax reactants. If the amount of molten paraffin wax is between 24% and about 45–55% the formation of the adduct is evidenced by the conversion of the entire mixture of urea and molten paraffin wax to a solid having about the texture of wet sand. Thus if 60 parts urea and 40 parts molten paraffin wax (M.P.=129° F.) is stirred in a beaker at 210° F. the entire mass becomes solid. It is not known with certainty why the entire mass turns solid even though an excess of molten wax is present. Apparently some or all of the excess wax is adsorbed on the surface of the adduct particles, any unadsorbed molten wax being insufficient in amount to render the solid adduct particles fluid.

On the other hand, if the amount of molten paraffin wax is higher than about 45–55% the mixture remains fluid even after the adduct has formed. Although some wax may be adsorbed on the adduct there is enough unadsorbed wax to impart fluidity to the reaction mass. In this case formation of the adduct can be determined by analysis (e.g., X-ray diffraction or differential thermal analysis) and usually also by examination of the mixture. The adduct precipitate is very fine and flocculent, of much smaller particle size than, for example, crystal urea. In cases where the reaction mixture remains fluid it can be converted to a dispersion of the adduct in solid wax by merely cooling it to a temperature below the melting point of the wax.

For several reasons including those mentioned previously, it is desirable that the solid urea reactant have a small particle size, preferably 98% through 200 mesh, more preferably 98% through 400 mesh. It is also preferable, as described previously, to effect contact of the solid urea and molten paraffin wax on a roller mill which has an opening between the rollers sufficiently low to insure that any urea discharged from the mill has a particle size as stated above. When the mixture of urea and molten paraffin wax are passed through a roller mill having such a roller clearance, or even a somewhat larger clearance, the discharge from the mill will usually be solid even if the amount of wax is higher than about 45–55%. This may seem inconsistent with the prior description but actually it is not. In the milling operation any excess wax which would normally remain molten as previously described is formed by the mill into very thin pieces or sheets. These thin sheets cool rapidly and the wax discharged from the mill is a solid. If the reaction had been carried out in an agitated vessel this excess wax would remain molten because this sheeting and rapid cooling would not occur. Actually this cooling of excess wax due to the inherent nature of the milling operation is advantageous since the wax would eventually have to be solidified anyway in order to use the dispersion of adduct in wax as a fertilizer.

In utilizing the novel method described above for forming the adduct dispersion, which method involves reaction of solid urea, the wax used should be paraffin wax.

The improvement in the resistance of the adduct to leaching by water which is effected by dispersing the adduct in wax is shown by the data in Table IV. These data were obtained by subjecting a number of compositions to the leaching test described previously. Each composition was prepared in the same manner as the composition which is the subject of Table II, i.e., by roller milling urea and molten paraffin wax until the urea and wax reacted to form an adduct. One pass through the mill was sufficient to adduct essentially all of the urea. However, the amount of molten paraffin wax was varied, consequently the compositions of Table IV contain a urea-paraffin wax adduct dispersed in varying amounts of paraffin wax. The paraffin wax used was of the same type used to prepare the compositions which are the subject of Table III.

*Table IV*

| Composition | Dispersion Composition | | Dispersion Composition | | Percent Urea Remaining After 3 Hours Under Water |
|---|---|---|---|---|---|
| | Percent Urea | Percent Wax | Percent Adduct | Percent Unadducted Wax | |
| 1 | 76 | 24 | 100 | 0 | 78 |
| 2 | 75 | 25 | 98.7 | 1.3 | 81 |
| 3 | 70 | 30 | 92.2 | 7.8 | 88 |
| 4 | 60 | 40 | 79.0 | 21.0 | 98 |
| 5 | 55 | 45 | 72.4 | 27.6 | 95.5 |
| 6 | 50 | 50 | 65.8 | 34.2 | 96.5 |

From the above data it is apparent that the water resistance of the adduct is improved by dispersing the adduct in paraffin wax. In addition, the water resistance of the adduct dispersed in paraffn wax is markedly superior to the water resistance of urea when it alone is dispersed in paraffin wax. This was pointed out previously and is further illustrated by the data contained in Table V which shows the results of leaching tests on two compositions both of which contain the same total amount of urea (50%) and paraffin wax (50%) but in one of which (Composition 1) the urea is in the adduct form while in the other (Composition 2) the urea is not in the adduct form. The leaching test on composition 2 was conducted immediately after preparation of composition 2.

*Table V*

| Composition: | Percent urea remaining after 3 hours under water |
|---|---|
| 1 | 96.5 |
| 2 | 80.0 |

It has already been pointed out that when forming the dispersion of adduct in paraffin wax by reaction of solid urea the particle size of the urea should be small. One of several reasons for this is that the urea particle size has a significant effect on the water leaching properties of the final dispersion. This is more clearly shown by the data contained in Table VI which show the leaching properties of a number of compositions obtained by reacting paraffin wax with urea of varying particle size. All compositions contain 60% urea-40% paraffin wax and all except the one indicated were prepared by adding the urea to the molten paraffin wax (200° F.) and stirring until the mass became solid. In the one exception the urea-paraffin wax mixture was milled in the same manner as used to prepare the composition which is the subject of Table II. The urea particle size is indicated, with one exception, by two sieve sizes, the first size being one through which all the particles would pass, the second being one through which none of the particles would pass.

*Table VI*

| Composition: | Percent urea remaining after 3 hours under water |
|---|---|
| 20–60 mesh | 60 |
| 60–80 mesh | 60 |
| 80–100 mesh | 68 |
| 100–140 mesh | 71 |
| 140–200 mesh | 77 |
| 325–400 mesh | 86 |
| 100% through 400 mesh (milled) | 92 |

These data clearly show the effect of urea particle size on the water resistance of the dispersion. Between 20 and 80 mesh there appears to be no significant change in the water resistance with change in particle size. At about 80 mesh, however, the water resistance increases rapidly as the urea particle size decreases. Preferably the particle size is 98% through 200 mesh, more preferably 98% through 400 mesh.

In many cases it will be desirable that the ultimate fertilizer dispersion composition contain essential elements in addition to nitrogen such as in the case of a complete fertilizer. In such a case the other fertilizer ingredients can be dispersed in the wax at essentially the same time the adduct is dispersed therein. If the adduct dispersion is to be made by mixing preformed adduct with wax the other fertilizer ingredients can be added to the wax at the same time the adduct is added. The wax and all fertilizer ingredients are then stirred, the resulting dispersion is shaped into small particles and the particles are allowed to cool. If the adduct dispersion is to be formed by reacting solid urea with an excess of molten paraffin wax, using a roller mill for example, other fertilizer ingredients can be included in the final composition merely by using a blend of solid urea and the other fertilizer ingredients rather than solid urea alone.

The relative amount of adduct and unreacted wax in the dispersions of the invention will depend mainly upon the type of fertilizer being prepared and upon the soil and climatic conditions at the location of actual use. Any amount of unreacted wax will, of course, effect some improvement in the water resistance of the adduct. In the case of a nitrogen fertilizer, however, the amount of adduct will normally be a major amount, i.e., over 50%, and the amount of wax will normally be a minor amount, i.e., less than 50%, each based on the total weight of adduct and unreacted wax. Usually the amount of adduct will be 60–99%, more frequently 60–90% and the amount of unreacted wax will usually be 1–40%, more frequently 10–40%. Within these ranges the amounts of adduct and unreacted wax can be varied to provide, as described hereinbefore, the proper water resistance for the actual soil and climatic conditions.

In the caes of a fertilizer containing a plurality of essential elements the total amount of fertilizer ingredients will still usually be a major amount and the unreacted wax will still normally be a minor amount, but the amount of adduct might be relatively small. For example a 10–10–10 slow release complete fertilizer might contain the following:

| | |
|---|---|
| Urea-paraffin wax adduct | 28.2 |
| Triple superphosphate | 21.8 |
| Potassium chloride | 16.7 |
| | 66.7 |
| Unreacted wax | 33.3 |
| Total | 100.0 |

Similarly a 5–15–10 slow release complete fertilizer might contain the following:

| | |
|---|---|
| Urea-paraffin wax adduct | 14.1 |
| Triple superphosphate | 32.6 |
| Potassium sulfate | 18.5 |
| | 65.2 |
| Unreacted wax | 34.8 |
| Total | 100.0 |

Normally the amount of adduct in a fertilizer containing a plurality of essential elements will not be less than 5% by weight of the total composition. Usually it will be at least 10%, more frequently at least 20%. Therefore considering both the case of the nitrogen fertilizer and the case of the fertilizer containing a plurality of essential elements, the amount of adduct will usually be 5-99 parts, more frequently 10-90 parts, and the amount of unreacted wax will usually be 1-40 parts, more frequently 10-40 parts.

When dispersions having a composition within a range of 5-99 parts adduct and 1-40 parts unreacted wax are prepared by the novel method of the invention, solid urea should be reacted with molten paraffin wax in the ratio of 0.33-10.84 parts paraffin wax per part of urea. This range of paraffin wax to urea ratio corresponds to the above ranges of adduct and unreacted paraffin wax. All parts in this specification are by weight. Where the dispersion contains 10-90 parts adduct and 10-40 parts wax solid urea should be reacted with molten paraffin wax in the ratio of 0.46-5.58 parts of the latter per part of the former.

We have also discovered that if asphalt is incorporated into the continuous phase (the unreacted wax) of the dispersion, additional improvements in the water resistance of the adduct are obtained. Where the adduct is dispersed in wax, the asphalt can be incorporated into the unreacted wax phase by heating the wax to a temperature of about 240-250° F., adding the asphalt to the wax and stirring until it dissolves therein, and then dispersing the adduct in the wax-asphalt mixture. Where the dispersion is formed by reacting solid urea with molten paraffin wax, the asphalt should be dissolved in the paraffin wax prior to reacting the latter with the solid urea. The water resistance of several compositions containing asphalt in the unreacted paraffin wax phase is shown in Table VII. The compositions were prepared by incorporating the asphalt into the molten wax and then reacting the wax-asphalt mixture with solid urea. The paraffin wax used was the same type used in preparing the composition which is the subject of Table II. The asphalt used was an oxidized petroleum asphalt having the following properties:

Softening point (ASTM D-30-26) _____° F__ 250
Specific gravity at 77° F. _____ 1.1
Penetration at 77° F.
  (ASTM D-45, 100 g., 5 sec.) _____mm__ 5
Ductility at 77° F.
  (ASTM D-113-44, 5 cm./min.) _____ 0

Also included in Table VII are data from previous tables showing the water resistance of corresponding compositions which contain no asphalt.

TABLE VII

| Percent Adduct | Percent Unreacted Wax | Percent Asphalt | Percent Asphalt as Percent of Unreacted Wax | Percent Urea Remaining After 3 Hours Under Water |
|---|---|---|---|---|
| 79 | 21 | | | 94 |
| 79 | 19 | 2 | 10.5 | 96.5 |
| 92.2 | 7.8 | | | 88 |
| 92.2 | 6.3 | 1.5 | 28.8 | 92 |

It can be seen from the above data that the inclusion of asphalt in the dispersion compositions of the invention effects a further improvement in the water resistance of the adduct. Alternatively, the incorporation of asphalt permits the same adduct water resistance to be obtained with a reduced amount of unreacted wax. Substantial improvements in the water resistance of the adduct are obtained when the amount of asphalt is in the range of 5-40% based on the weight of unreacted wax. For dispersions of adduct in wax containing 5-99 parts adduct and 1-40 parts unreacted wax the amount of asphalt, based on the total amount of wax, i.e., the reacted and unreacted wax, will be 0.2-38.8%.

A broad range of asphalts can be used in the invention. For example, suitable asphalts are those derived from petroleum which are usually vacuum distillation bottoms obtained in the processing of asphaltic crude oils according to conventional petroleum refining techniques. Such asphalts generally have the following properties:

Specific gravity at 77° F. _____ 0.8-1.5
Penetration at 77° F. (ASTM D5-47, 100 gms.,
  5 sec.) _____mm__ 0-300
Softening point (ASTM D30-26) _____° F__ 50-350
Solubility in 86° naphtha _____percent__ 40-98
Ductility at 77° F. (ASTM D113-44, 5 cm.
  per min.) _____cm__ 0-150
Viscosity at 347° F. (ASTM D88-44, Saybolt-
  Furol) _____sec__ 30-700

Particularly suitable asphalts are vacuum distillation bottoms which have been solvent extracted and/or oxidized to a high softening point, low penetration, and low ductility. They are hard and brittle at ambient temperature and have no tendency to become sticky or to cold flow. They are particularly suitable for fertilizers since the latter should be free flowing at any ambient temperatures encountered between manufacture and consumer use. Such asphalts generally have properties as follows:

Specific gravity at 77° F. _____ 0.8-1.5
Penetration at 77° F. (ASTM D5-45, 100 gms.,
  5 sec.) _____mm__ 0-20
Softening Point (ASTM D30-26) _____° F__ 175-350
Solubility in 86° naphtha _____percent__ 40-98
Ductility at 77° F. (ASTM D113-44, 5 cm.
  per min.) _____cm__ 0-10
Viscosity at 347° F. (ASTM D88-44, Saybolt-
  Furfol) _____sec__ 30-700

It was mentioned previously that a disadvantage of forming a slow release urea fertilizer composition by forming a dispersion of solid urea in solid wax is that the wax content of the fertilizer must often be unduly high in order to obtain a fertilizer with adequate water resistance. As already described one method of reducing the wax content is to employ the urea in the form of a urea-paraffin wax adduct. Another method has now been found which is based upon the surprising discovery that the water resistance of a dispersion of solid urea in solid paraffin wax improves with time. In other words, the water resistance of a dispersion of solid urea in solid paraffin wax is distinctly higher say one week after preparation than immediately after preparation. The improvement in water resistance is apparently due to reaction between the solid urea and solid paraffin wax to form a urea-paraffin wax adduct. This improvement is only obtained when the fertilizer is urea and the wax is paraffin wax.

Thus while a dispersion of solid urea in solid paraffin wax has heretofore often been unsuitable as a slow release fertilizer because of a relatively poor water resistance, such a dispersion can now be made suitable in many applications by aging the dispersion prior to use, i.e., by allowing time to elapse between preparation of the dispersion and use of same as a fertilizer. Thus another embodiment of the invention is a method of preparing a slow release fertilizer which comprises forming a dispersion of solid urea and solid paraffin wax and then aging the resulting dispersion.

The improved water resistance of a dispersion of solid urea in solid paraffin wax due to aging is clearly illustrated by the data contained in Table VIII. Each composition in the table is a dispersion of solid urea in solid paraffin wax and is prepared in essentially the manner as described previously, i.e., by heating the wax to about 200° F., mixing commercial crystal urea with the molten wax, forming the resulting dispersion into particles by means of a mold, and cooling the particles to room temperature. The paraffin wax used is the same as was used to prepare the compositions which are the subject of Table III. The amount of urea and paraffin wax in each composition is as shown. For each composition the water resistance is determined immediately after preparation and then again after the lapse of the period of time indicated in Table VIII, which time is defined for the present purpose as the aging time. The water resistance is determined in essentially the same manner as previously described, i.e., by submerging a sample of the composition in water at room temperature and without agitation, determining the amount of urea dissolved in the water at periodic intervals thereafter, the intervals being described as submergence time in Table VIII, and then calculating the amount of urea remaining in the fertilizer at the same intervals. This method of determining water resistance is defined for the present purpose as determining the water resistance by submergence in water. The time under water is indicated in Table VIII as the submergence time. The percent urea remaining in the fertilizer is the numerical value of water resistance. The two aging conditions employed are also shown in Table VIII. The condition "open" means that the fertilizer particles are exposed to the atmosphere for the stated aging period. The condition "closed" means that the particles are placed in an essentially air tight jar for the entire aging period. In all cases the aging is at room temperature, i.e., about 25° C.

better than that of the unaged fertilizer. Another improvement criteria is the amount of urea which is in the adduct form at the end of the aging period. Preferably the aging period is sufficient so that at least 10%, preferably 20%, more preferably 50%, of the urea is in adduct form. Another means of defining the improvement is in terms of the aging period. Substantial improvement in the fertilizer water resistance is obtained by aging the fertilizer for 2 weeks (14 days). Preferably the aging period is 1 month (30 days).

The dispersion of solid urea in solid wax can be formed as already described. Preferably the urea has a particle size of 75% larger than 100 mesh. The amount of urea in the dispersion of solid urea in solid paraffin wax should be 15–80%, preferably 25–70%, and the amount of paraffin wax should be 20–85%, preferably 30–75%, the percentages being based on the total weight of urea and paraffin wax.

The invention claimed is:

1. A particulate slow release fertilizer composition which comprises a dispersion of a urea-paraffin wax adduct in petroleum wax, the amount of the last-mentioned wax being sufficient to improve the water resistance of said adduct.

2. Composition according to claim 1 wherein the amount of adduct is in the range of 5–99 parts and the

*Table VIII*

| Composition | Amount Urea (Percent) | Amount Paraffin Wax (Percent) | Percent Urea Remaining | | Aging Condition | Aging Time (Days) | Submergence Time (Hrs.) |
|---|---|---|---|---|---|---|---|
| | | | Initial | Aged | | | |
| 1 | 60 | 40 | 60.8 | 72.1 | Open | 13 | 8 |
| 2 | 60 | 40 | 76.5 | 89.0 | Closed | 23 | 3 |
| | | | 54.0 | 88.0 | Closed | 23 | 8 |
| | | | 21.0 | 85.3 | Closed | 23 | 24 |
| | | | 11.0 | 83.0 | Closed | 23 | 72 |

It is evident from the data contained in Table VIII that a substantial improvement in the water resistance of a dispersion of solid urea in solid paraffin wax can be effected by aging the dispersion. By comparing the 8 hours water resistance for compositions 1 and 2 it can be seen that longer aging periods effect greater improvement. It is also apparent from the data that the aging conditions are not critical, i.e., the fertilizer particles can be either exposed or not exposed to the atmosphere during the aging period.

In order to determine the reason for the improved water resistance obtained by aging the fertilizer, a sample of composition 2 which had aged for 23 days was analyzed by X-ray diffraction and differential thermal analysis. The analysis showed that the aged composition contained a substantial amount of urea-paraffin wax adduct, a lesser amount of paraffin wax, and a trace amount of free urea. It is of course, completely surprising that the reaction resulting in the formation of the adduct would occur, especially at room temperature, between urea and paraffin wax when both are in the solid state.

The improvement in water resistance can be varied by varying the aging time as already described. The improvement desired will depend, of course, on the ultimate use conditions of the fertilizer. However, the fertilizer is preferably aged until the water resistance of the fertilizer after 72 hours under water is improved, i.e., until the percent urea remaining after 72 hours under water is higher in the aged fertilizer than in the unaged fertilizer. Preferably the water resistance of the aged fertilizer is 100% amount of the last-mentioned wax is in the range of 1–40 parts.

3. Composition according to claim 1 wherein the last-mentioned wax contains 5–40 percent, based on the weight of said last-mentioned wax, of asphalt.

4. Composition according to claim 1 wherein the last-mentioned wax is also a paraffin wax.

5. Composition according to claim 4 wherein the amount of adduct is in the range of 10–90 parts and the amount of the last-mentioned wax is in the range of 10–40 parts.

6. Method of preparing a slow release fertilizer which comprises reacting solid urea with molten paraffin wax until a urea-paraffin wax adduct is obtained and cooling the reaction product mixture to a temperature below the melting point of said paraffin wax, whereby a dispersion of a urea-paraffin wax adduct in solid paraffin wax is obtained, the amount of the first-mentioned molten paraffin wax being 0.33–10.84 parts per part of said solid urea.

7. Method according to claim 6 wherein the amount of the first-mentioned molten paraffin wax is 0.46–5.58 parts per part of said solid urea.

8. Method according to claim 6 wherein the urea has a particle size of 98 percent through a 200 mesh sieve.

9. Method according to claim 6 wherein the first-mentioned molten paraffin wax contains, based on the weight of same, 0.2–38.8 percent asphalt and wherein the amount of asphalt is 5–40 percent based on the portion of said first-mentioned molten paraffin wax which does not react with said solid urea.

10. Method of preparing a slow release fertilizer which comprises (1) dispersing solid urea in molten paraffin wax, (2) cooling the resulting dispersion below the solidification point of the dispersion to obtain a dispersion of solid urea in solid paraffin wax, and (3) aging the latter dispersion out of contact with liquid water for a period of at least one month, wherein the amount of solid urea in Step 1 is 15–80 percent and the amount of molten paraffin wax in Step 1 is 20–85 percent, the percentages being based on the total amount of solid urea and molten paraffin wax in Step 1.

11. Method according to claim 10 wherein at the end of said aging period at least 10% of the solid urea in step (1) is in adduct form.

References Cited by the Examiner
UNITED STATES PATENTS

| | | | |
|---|---|---|---|
| 2,936,226 | 5/1960 | Kaufman et al. | 71—64 |
| 3,014,783 | 12/1961 | Young | 71—64 |
| 3,096,171 | 7/1963 | Woerther | 71—64 |

DONALL H. SYLVESTER, *Primary Examiner.*

ANTHONY SCIAMANNA, S. LEON BASHORE, T. D. KILEY, *Assistant Examiners.*